US006752126B2

United States Patent
Pfaeffle et al.

(10) Patent No.: US 6,752,126 B2
(45) Date of Patent: Jun. 22, 2004

(54) METHOD AND DEVICE FOR CONTROLLING AN INTERNAL COMBUSTION ENGINE

(75) Inventors: Andreas Pfaeffle, Wuestenrot (DE); Christof Hammel, Stuttgart (DE); Peter Schubert, Leingarten (DE); Andreas Kellner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/088,219

(22) PCT Filed: Jun. 19, 2001

(86) PCT No.: PCT/DE01/02264

§ 371 (c)(1),
(2), (4) Date: Jul. 17, 2002

(87) PCT Pub. No.: WO02/06655

PCT Pub. Date: Jan. 24, 2002

(65) Prior Publication Data

US 2003/0029415 A1 Feb. 13, 2003

(30) Foreign Application Priority Data

Jul. 18, 2000 (DE) .......................................... 100 34 807
May 11, 2001 (DE) .......................................... 101 23 035

(51) Int. Cl.$^7$ ................................................ F02M 7/00
(52) U.S. Cl. ........................ 123/436; 123/299; 123/478
(58) Field of Search .................................. 123/299, 300, 123/478, 446, 436

(56) References Cited

U.S. PATENT DOCUMENTS

| 4,697,558 A | * | 10/1987 | Meneely ...................... 123/321 |
| 4,793,307 A | * | 12/1988 | Quenneville et al. ........ 123/323 |
| 4,913,113 A | * | 4/1990 | Baranescu ................... 123/300 |
| 5,507,260 A | * | 4/1996 | Hintzen ...................... 123/299 |
| 5,887,799 A | * | 3/1999 | Smith ....................... 239/585.1 |
| 6,032,642 A | | 3/2000 | Trumbower et al. |
| 6,073,608 A | * | 6/2000 | Krieger et al. .............. 123/299 |
| 6,293,248 B1 | * | 9/2001 | Zsoldos et al. ............. 123/321 |
| 6,394,067 B1 | * | 5/2002 | Usko et al. ................. 123/321 |
| 6,439,202 B1 | * | 8/2002 | Carroll et al. .............. 123/467 |

FOREIGN PATENT DOCUMENTS

| EP | 0570986 | 11/1993 |
| EP | 0899443 | 3/1999 |
| EP | 0921296 | 6/1999 |

\* cited by examiner

*Primary Examiner*—John Kwon
(74) *Attorney, Agent, or Firm*—Kenyon & Kenyon (57) ABSTRACT

A method and a device is described for controlling an internal combustion engine using fuel metering. The fuel metering is divisible into at least a first partial injection and a second partial injection. In the second partial injection, a fuel quantity variable, characterizing the fuel quantity injected in the second partial injection, is corrected on the basis of at least one pressure variable, characterizing the fuel pressure, as well as of the fuel quantity variable and at least one further variable.

10 Claims, 6 Drawing Sheets

METHOD AND DEVICE FOR CONTROLLING AN INTERNAL COMBUSTION ENGINE

FIELD OF THE INVENTION

The present invention relates to a method and a device for controlling an internal combustion engine.

BACKGROUND INFORMATION

A method and a device for controlling an internal combustion engine are known from German Patent 197 12 143. In the mode of operation described there, the fuel injection of one cycle is divided into a first partial injection and a second partial injection. In this context, the rail pressure, which is used for calculating the duration of the main injection, is corrected as a function of the duration of the pre-injection and of the interval between the pre-injection and the main injection.

In common-rail systems of this type, pressure fluctuations occur after every injection. The quantity of fuel injected during the main injection is fundamentally a function of the fuel pressure in the main injection. Fluctuations in the fuel pressure result in fluctuations in the quantity of fuel injected.

SUMMARY OF THE INVENTION

The present invention is based on reducing the influence of pressure fluctuations on the quantity of fuel injected.

As a result of the fact that in the second partial injection a fuel-quantity variable characterizing the quantity of fuel injected in the second partial injection can be corrected as a function of at least one pressure variable, which characterizes the fuel pressure, and of the fuel quantity variable, the influence of the subsequent partial injection on the subsequent partial injection can be significantly reduced. In a common-rail system, as a pressure variable, the rail pressure is preferably used. As a fuel-quantity variable, a fuel quantity to be injected, a drive duration for a corresponding actuator, or another variable characterizing the fuel quantity to be injected can be used.

A further reduction of the influence of the two partial injections on each other can be attained if, in addition, the fuel-quantity variable can be corrected as a function of an interval between the two partial injection and/or of a temperature variable. In this context, the interval between the actual injection end and the actual injection beginning can be used. Alternatively, the interval between the drive end and the drive beginning can be taken into account. Furthermore, it is also possible to have recourse to variables characterizing the interval between the partial injections.

It is particularly advantageous if the fuel-quantity variable, corrected in this manner, is limited to a minimum value. This means that if the fuel-quantity variable is smaller than a minimum value, then the minimum value is used as the fuel-quantity variable.

The minimum value is preferably specifiable at least as a function of the rail pressure and/or of the interval between the two partial injections.

It is particularly advantageous if this correction takes place after a further correction, using a quantity-balancing regulation. As a result of the sequence of corrections, the two corrections are prevented from influencing each other in an undesirable manner.

Due to the fact that the correction is only carried out in certain operating states, it is achieved that the correction only takes place in those operating states in which the two partial injections influence each other, or in which the correction is effective.

The correction is arrived at in a particularly simple manner as a result of the fact that a basic value is determined as a function of at least the pressure variable and/or the interval between the two partial injections, that a weighting factor is determined as a function of at least the fuel-quantity variable, and that the correction of the fuel quantity to be injected takes place as a function of the basic value, which is arrived at using the weighting factor.

DETAILED DESCRIPTION

Figure 1:
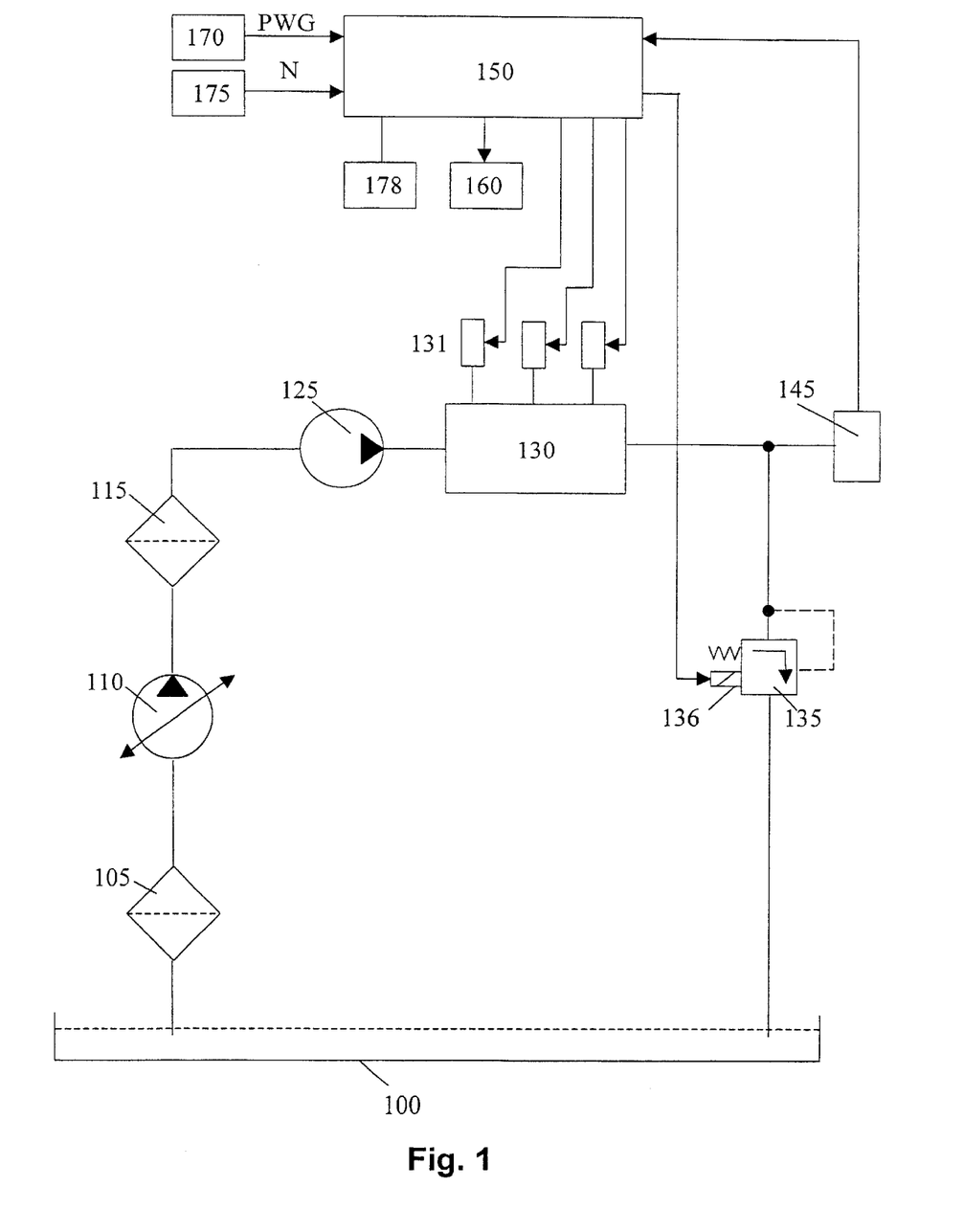
FIG. 1 depicts a block diagram of the device according to the present invention.

In FIG. 1, a fuel supply system of an internal combustion engine is depicted. The depicted system is usually termed a common-rail system.

Reference numeral 100 designates a fuel tank. This is connected via a first filter 105 to a pre-pump 110 and a second filter means 115. From second filter means 115, the fuel travels through a line to a high-pressure pump 125. High-pressure pump 125 is connected to a rail 130.

Rail 130, which can also be termed a storage unit 130, is in contact with various injectors 131 via fuel lines. Via a pressure regulating valve 135, rail 130 can be connected to fuel tank 100. Pressure regulating valve 135 can be controlled using a coil 136.

The area between the output of high-pressure pump 125 and the input of pressure regulating valve 135 is termed the high-pressure area. In this high-pressure area, the fuel is placed under high pressure. The fuel pressure in the high-pressure area is measured using a sensor 145.

The output signal of sensor 145 is provided to a control unit 150. The control unit 150 acts upon coil 136 of pressure regulating valve 135 using a drive signal. In addition, further control units 160 are acted upon by drive signals. In this context, it is a question of, for example, actuators for influencing the exhaust gas recirculation rate, the boost pressure, the injected fuel quantity, and/or the beginning of the injection. Controlling the injection of fuel is carried out by driving injectors 131.

Control unit 150 processes the signals of various sensors 170 and 175. Sensor 170 supplies a signal PWG, which corresponds to the gas pedal position. Sensor 175 supplies a rotational speed signal N. In addition, other sensors 178 can also be provided, which supply further signals, for example, with respect to the position, the coupling, or the transmission.

This device operates as follows. The fuel, which is located in fuel tank 100, is conveyed by pre-pump 110 through filter means 105 and 115. On the output side of the pre-pump 110, the fuel is subjected to a pressure between 1 and roughly 3 bar.

High-pressure pump 125 conveys the fuel from the low-pressure area into the high-pressure area. High-pressure pump 125 creates a very high pressure in rail 130. Usually, in systems for spark-ignition internal combustion engines, pressure variables of roughly 30 to 100 bar are achieved, and in self-igniting internal combustion engines pressure variables of roughly 1000 to 2000 bar are achieved. Via injectors 131, the fuel, under high pressure, can be metered to the individual cylinders of the internal combustion engine.

Using sensor 145, measured fuel pressure P is measured in the rail, or in the entire high-pressure area. Using pressure-regulating valve 135, which is driven by a coil 136, it is possible to regulate, for example, the pressure in the high-pressure area. As a function of the voltage applied at coil 136, or of the current flowing through coil 136, pressure-regulating valve 135 opens in response to varying pressure variables. In addition, it can also be provided that the pressure regulation is carried out using a controllable high-pressure pump.

Often the injection during one metering cycle is divided into a plurality of partial injections. Usually, at least one or two pre-injections, a main injection, and an after-injection are provided. The intervals between the individual partial injections can be applied in a variable manner, i.e., they can be provided in a fixed manner so as to be a function of the system, or in the case of especially advantageous embodiments, they can be provided so as to be a function of the operating state of the internal combustion engine.

The specific injection is substantially influenced by the preceding injection and is more weakly influenced by those occurring before that. This is predominantly due to the fact that an injection causes a pressure wave in the line between the rail and the injector.

According to the present invention, in order to compensate for the influence of the pressure wave, a supplemental corrective quantity is made available, which manipulates the desired injection quantity so that the calculated drive duration of the injection quantity, corrected in this manner, behaves such that the desired injection quantity is actually injected.

As a result of the method according to the present invention and the device according to the present invention, the change in the injection quantity, caused specifically by pressure waves that are caused by preceding injections, is reduced, and as a result the precision of the quantity in the common-rail system is improved in multiple injections.

In the mode of depicted process, the correction of the injection quantity advantageously occurs as a function of the immediately preceding injections. Injections that take place long before can generally be ignored. In particular, only injections of the same metering cycle, i.e., partial injections, are taken into account.

For the purposes of this invention the partial injection occurring first is designated as the preceding partial injection, and the second partial injection in temporal succession is designated as the succeeding partial injection.

Figure 2:
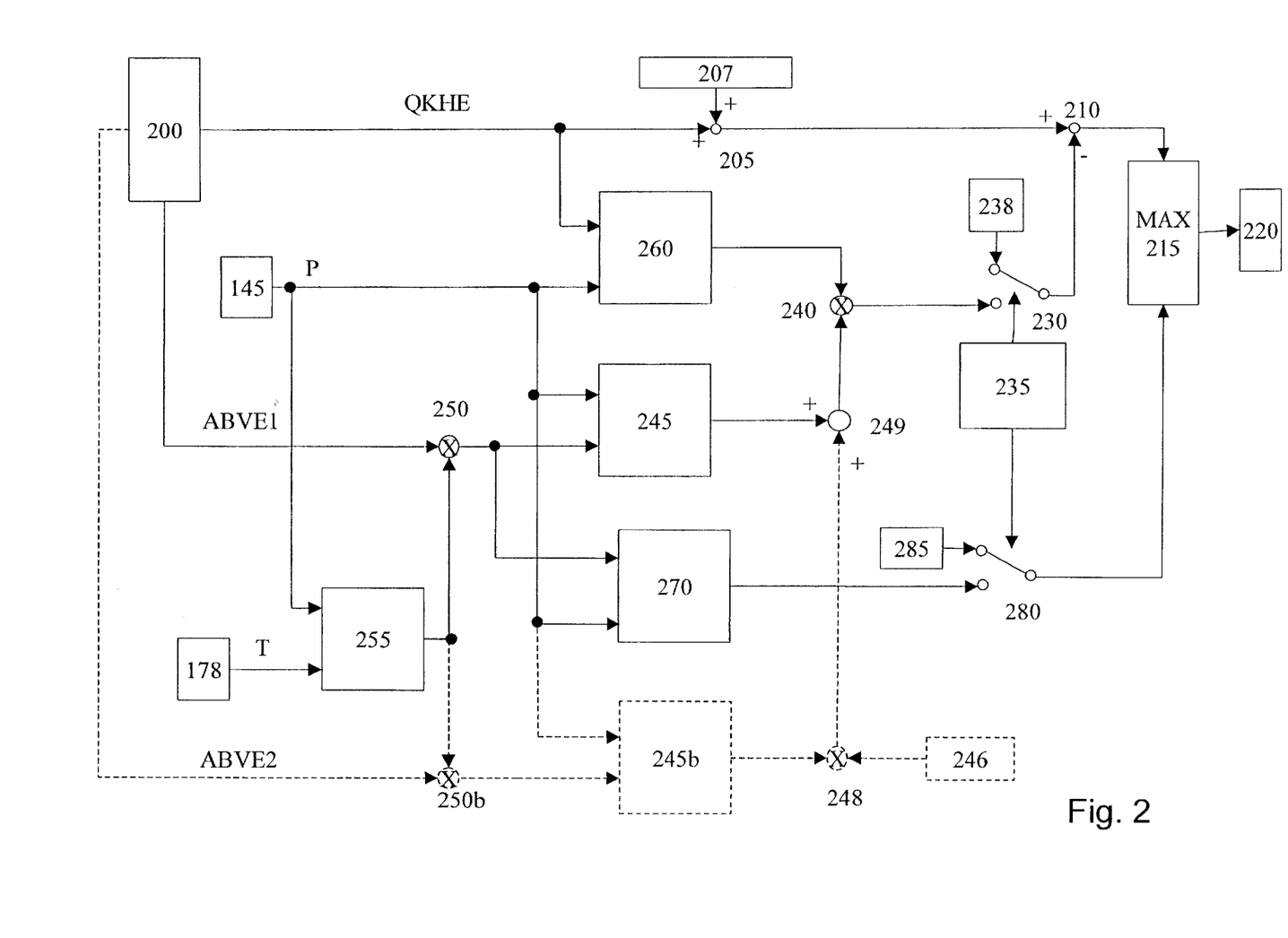
FIGS. 2, 2a, 3, 3a and 4 depict in block diagrams various embodiments of the mode of operation according to the present invention.

In FIG. 2, a first embodiment is depicted as a block diagram. Elements already described in FIG. 1 are provided with corresponding reference numerals. The structure depicted in FIG. 2 is advantageously contained in control unit 150. In particular, the structure is configured as a program for carrying out the corresponding method.

The method described below especially applies to the correction of the influence of the first pre-injection on the succeeding second pre-injection and to the influence of the second pre-injection on the main injection immediately following. In one especially advantageous embodiment, the influence of two pre-injections on the main injection is corrected.

In what follows, the correction is described on the basis of the example of correcting the quantity of main injection QKHE. A quantity input 200 determines a signal QKHE, that characterizes the injection quantity in the main injection. Using the signal, a connection point 205 is acted upon. At the second input of connection point 205, the output signal of a quantity-balancing regulation 207 is applied, also having a positive sign. The output signal of connection point 205, having a positive sign, arrives at a second connection point 210, which in turn acts upon a maximum selection 215. Using the output signal of maximum selection 215, a characteristics map calculation 220 is acted upon, which, from the quantity variables and further variables such as the fuel pressure, determines the drive duration for the injectors.

At the second input of connection point 210, the output signal, having a negative sign, of a switching means 230 is applied, which alternatively transmits the output signal, of a zero-value input 238, or of a connection point 240, to connection point 210. Switching means 230 is acted upon by a correction control 235 using drive signals. Connection point 240, preferably in a multiplicative manner, joins the output signal of a basic value input 245 and the output signal of a weighting factor input 260.

Supplied to weighting factor input 260 are output signal QKHE of quantity input 200 and output signal P of rail pressure sensor 145. Basic value input 245 processes output signal P of rail pressure sensor 145 as well as the output signal of a connection point 250. Supplied to connection point 250 from the input 200 is a signal that characterizes interval ABVE1 between the two partial injections. Furthermore, in connection point 250, a correction factor is added, which is determined by a temperature correction 255. Temperature correction 255 processes output signal T of a temperature sensor 178 and output signal P of pressure-rail pressure sensor 145.

Also supplied to a minimum value input 270 are the output of rail pressure sensor 145 and the output of connection point 250. This signal arrives at a switching means 280, where a second input which is the output signal of a minimum value input 285 is applied. Switching means 280 conveys one of the two signals, as a function of the drive signal of a correction control 235, to a second input of maximum selection 215.

One especially advantageous embodiment provides that the influence of a second partial injection that occurs temporally before the first partial injection is also taken into account. This specific embodiment is indicated by the dotted lines. A further basic value input 245b processes output signal P of rail pressure sensor 145 as well as the output signal of a connection point 250b. A signal characterizing interval ABVE2 between the partial injection to be corrected and the partial injection whose interval is taken into account is supplied to connection point 250b from quantity input 200. The output signal of basic value input 245b is combined in a further connection point 248 with the signal of a weighting 246, which takes into account the influence that is weakened by the intervening injection.

In quantity input 200, fuel quantity to be injected QKHE of the main injection is stored as a function of various operating characteristics, such as, driver input and rotational speed. This value is corrected in connection point 205 by the output signal of quantity balancing regulation 207. The quantity balancing regulation 207 assures that all cylinders are contributing the same torque to the overall torque. As a result of the quantity balancing regulations, dispersions of the injectors with respect to the fuel quantity injected and/or influences on the combustion, which can lead to unequal torques, are compensated for.

Fuel quantity to be injected QKHE, arrived at in this manner, for the main injection, is corrected in connection point 210 using a correction value, which compensates for the influence of the pressure fluctuations due to the pre-injection. The correction value is essentially composed of the basic value and a weighting factor, which are combined in a multiplicative manner in connection point 240.

The basic value is stored in basic-value input 245, which is preferably configured as a characteristics map. The basic value is read out from the characteristics map of basic-value input 245 as a function of rail pressure P and a corrected interval ABVE1 between the two partial injections. Advantageously, the dependency of the basic value on the interval represents a periodic function, which is influenced by the pressure fluctuations. Basic-value input 245 essentially takes into account the frequency of the pressure fluctuations.

If the influence of the still earlier partial injection is taken into account, then two basic values are formed for the two partial injections to be considered. The basic value, which is formed advantageously using additive combination, is used accordingly.

The weighting factor is stipulated by weighting-factor input 260, which is also configured, as a characteristics map, as a function of rail pressure P and the fuel quantity to be injected in the injection to be corrected. The weighting input essentially takes into account the amplitude of the pressure fluctuations. Subsequently, the two values are multiplied.

In this embodiment, the basic value is stipulated on the basis of values that characterize rail pressure P and a corrected interval ABVE1 between the two partial injections. The weighting factor is stipulated on the basis of values that characterize rail pressure P and the fuel quantity to be injected in the injection to be corrected.

Using switch 230, the correction in certain operating states can be placed out of operation. In these operating states, in which no correction takes place, a value of 0 is stipulated as the correction value from zero-value input 238.

It is particularly advantageous if interval ABVE1 between the two partial injections is corrected as a function of the temperature. For this purpose, an appropriate correction factor, as a function specifically of rail pressure P and/or temperature T, is stored in temperature correction 255. Interval ABVE1 is multiplied by this correction factor in connection point 250. Correspondingly, a correction of interval ABVE2 takes place in connection point 250b.

As the temperature, it is advantageous to use the fuel temperature, which is measured by an appropriate sensor. Fuel quantity QKH to be injected, which is corrected in this manner, for the main injection, is balanced in maximum selection 215 using a fuel quantity that can be minimally depicted. The latter is read out from a characteristics map from the minimum-value input 270 as a function of the rail pressure and interval ABVE1 and/or interval ABVE2 between the specific partial injections.

According to the present invention, as a function of rail pressure P and preferably a temperature-corrected interval of the two partial injections, the basic value of the correction quantity is calculated from a characteristics map. Characteristics map 245 contains the offset of the injection quantity when there was a preceding injection with respect to the fuel quantity when there was no preceding injection, at a constant fuel temperature, as a function of the rail pressure and the interval between the two partial injections. The basic value takes into account the dependency of the pressure fluctuations, and therefore of the correction quantity, for the temporal interval between the two partial injections. In this context, this temporal sequence of the correction is also, to a slight extent, a function of the rail pressure.

At the pump-and/or the engine test stand, this characteristics map is determined at the injection quantities, or injection durations, that are typical for the specific pressure. The interval that has been determined by quantity input 200 is corrected using the correction factor which can also be read out from a characteristics map as a function of rail pressure and fuel temperature, and it is normalized at the reference temperature of the basic characteristics map. This characteristics map is advantageously derived from fuel data or is also measured at the test stand. The interval corrected in this manner acts as an input variable for the characteristics map for calculating the basic value.

The correction quantity calculated from the basic characteristics map is subsequently multiplied by the weighting factor from the characteristics map stored in weighting-factor input 260, as a function of the rail pressure and the injection quantity of the injection to be corrected, in order to adjust the correction quantity to the injection quantities deviating from the injection quantity taken into account in the basic characteristics map. This characteristics map is also determined at the test stand for one or two fixed intervals ABVE1 between the two partial injections. These intervals are selected so that a maximum quantity and/or a minimum quantity arise in the basic characteristics map.

The correction value determined in this manner, which represents the offset with respect to an injection not having a preceding injection, is now derived in the connection point 210 from desired injection quantity and is supplied to maximum value selection 215. In maximum value selection 215, this value is compared with a minimum quantity, which is read out from the characteristics map of minimum value input 270. The minimum quantity is also calculated as a function of the rail pressure and of the interval between the two partial injections. For determining the characteristics map, the drive duration of the injectors is set at the minimum drive duration for the specific rail pressure.

Figure 2A:
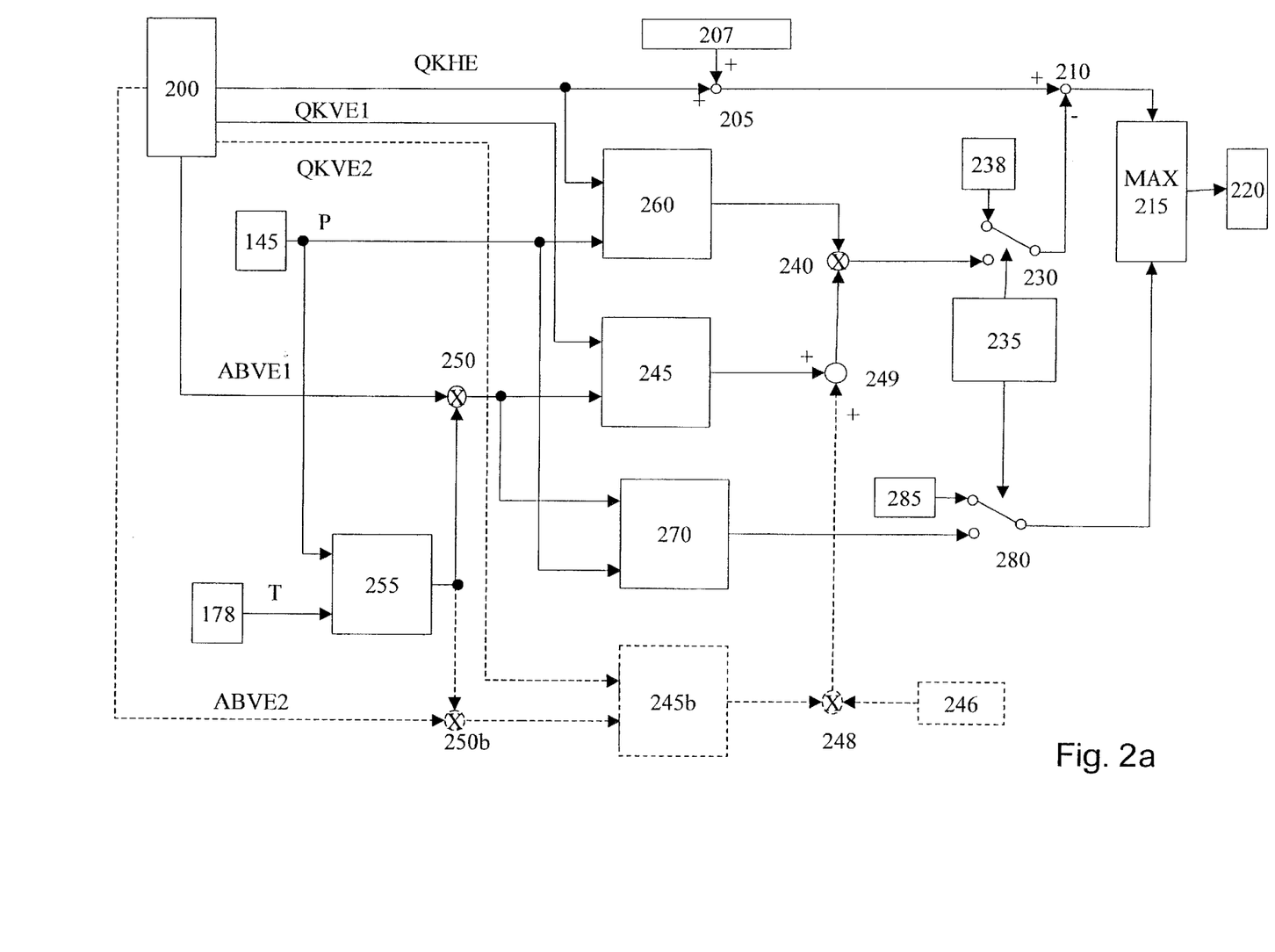

One particularly advantageous embodiment is depicted in FIG. 2a. In what follows, the correction is described on the basis of the example of the correction of the quantity of main injection QKHE. A quantity input 200 determines a signal QKHE, which characterizes the injection quantity in the main injection. This signal acts upon a connection point 205. At the second input of connection point 205, the output signal, also having a positive sign, of a quantity balancing regulation 207 is applied. The output signal of connection point 205 arrives, having a positive sign, at a second connection point 210, which in turn acts upon a maximum selection 215. Using the output signal of maximum selection 215, the characteristics map calculation 220 is then acted upon, which, from the quantity variables and other variables, such as, fuel pressure, determines the drive duration for the injectors.

At the second input of connection point 210, the output signal, having a negative sign, of a switching means 230 is applied, which alternatively conveys the output signal of a zero-value input 238, or of a connection point 240, to connection point 210. Switching means 230 is acted upon by drive signals from a correction control 235. Connection point 240 advantageously combines in a multiplicative manner the output signal of a basic value input 245 and the output signal of a weighting factor input 260.

Supplied to weighting factor input 260 are output signal QKHE of quantity input 200 and output signal P of rail pressure sensor 145. Basic value input 245 processes output signal QKVE1 of quantity input 200 as well as the output signal of a connection point 250. Supplied to connection point 250 from quantity input 200 is a signal that characterizes interval ABVE1 between the two partial injections. Furthermore, in connection point 250, a correction factor is supplied which is determined by a temperature/pressure correction 255. Temperature/pressure correction 255 processes output signal T of a temperature sensor 178 and output signal P of rail pressure sensor 145.

Also supplied to a minimum value input 270 are the output signal of rail pressure sensor 145 and the output signal of connection point 250. This signal arrives at a switching means 280, where a second input which is the output signal of a minimum value input 285 is applied. Switching means 280 conveys one of the two signals, as a function of the drive signal of a correction control 235, to a second input of maximum selection 215.

In one particularly advantageous embodiment, it is provided that the influence of a second partial injection is also taken into account, which occurs temporally before the first partial injection. This embodiment is depicted as indicated by the dotted lines. A further basic value input 245b processes output signal QKVE2 of quantity input 200 as well as the output signal of a connection point 250b. A signal characterizing interval ABVE2 between the partial injection to be corrected and the partial injection whose interval is taken into account is supplied to connection point 250b from quantity input 200. The output signal of basic value input 245b is combined in a further connection point 248 with the signal of a weighting 246, which takes into account the influence that is weakened by the intervening injection.

In quantity input 200, fuel quantity to be injected QKHE of the main injection is stored as a function of various operating characteristics, such as, driver input and rotational speed. This value is corrected in connection point 205 by the output signal of quantity balancing regulation 207. The quantity balancing regulation 207 assures that all cylinders are contributing the same torque to the overall torque. As a result of the quantity balancing regulations, dispersions of the injectors with respect to the fuel quantity injected and/or influences on the combustion, which can lead to unequal torques, are compensated for.

Fuel quantity to be injected QKHE, that is arrived at in this manner, for the main injection, is corrected in connection point 210 using a correction value, which compensates for the influence of the pressure fluctuations due to the pre-injection. The correction value is essentially composed of the basic value and a weighting factor, which are combined in a multiplicative manner in connection point 240.

The basic value is stored in basic-value input 245, which is preferably configured as a characteristics map. The basic value is read out from the characteristics map of basic-value input 245 as a function of pre-injection quantity QKVE1 and a corrected interval ABVE1 between the two partial injections. Advantageously, the dependency of the basic value on the interval represents a periodic function, which is influenced by the pressure fluctuations. Basic-value input 245 essentially takes into account the frequency of the pressure fluctuations.

If the influence of the still earlier partial injections is taken into account, then two basic values are formed for the two partial injections to be considered. The basic value, which is formed advantageously using additive combination is used accordingly.

The weighting factor is stipulated by weighting-factor input 260, which is also configured, as a characteristics map, as a function of rail pressure P and the fuel quantity to be injected in the injection to be corrected. The weighting input essentially takes into account the amplitude of the pressure fluctuations. Subsequently, the two values are multiplied.

Using switch 230, the correction in certain operating states can be placed out of operation. In these operating states, in which no correction takes place, a value of 0 is stipulated as the correction value from zero-value input 238.

It is particularly advantageous if interval ABVE1 between the two partial injections is corrected as a function of the temperature. For this purpose, an appropriate correction factor, as a function specifically of rail pressure P and/or temperature T, is stored in temperature correction 255. Interval ABVE1 is multiplied by this correction factor in connection point 250. Correspondingly, a correction of interval ABVE2 takes place in connection point 250b.

As the temperature, it is advantageous to use the fuel temperature, which is measured by an appropriate sensor. Fuel quantity to be injected QKH, which is corrected in this manner, for the main injection, is compared in maximum selection 215 with a fuel quantity that can be minimally depicted. The latter is read out from a characteristics map from the minimum-value input 270 as a function of the rail pressure and interval ABVE1 and/or interval ABVE2 between the specific partial injections.

According to the present invention, as a function of pre-injection quantity QKVE and a preferably temperature-corrected interval of the two partial injections, the basic value of the correction quantity is calculated from a characteristics map. Characteristics map 245 contains the offset of the injection quantity when there was a preceding injection with respect to the fuel quantity when there was no preceding injection, at a constant fuel temperature, as a function of the pre-injection quantity and the interval between the two partial injections. The basic value takes into account the dependency of the pressure fluctuations, and therefore of the correction quantity, for the temporal interval between the two partial injections. In this context, this temporal sequence of the correction is also, to a slight extent, a function of the rail pressure.

At the pump-and/or the engine test stand, this characteristics map is determined at the injection quantities, or injection durations, that are typical for the specific pressure. The interval that has been determined by quantity input 200 is corrected using the correction factor, which can also be read out from a characteristics map as a function of rail pressure and fuel temperature, and it is normalized at the reference temperature of the basic characteristics map. This characteristics map is advantageously derived from fuel data, or it is also measured at the test stand. The interval corrected in this manner acts as an input variable for the characteristics map for calculating the basic value.

The correction quantity calculated from the basic characteristics map is subsequently multiplied by the weighting factor from the characteristics map stored in weighting-factor input 260, as a function of the rail pressure and the injection quantity of the injection to be corrected, in order to adjust the correction quantity to the injection quantities deviating from the injection quantity taken into account in the basic characteristics map. This characteristics map is also determined at the test stand for one or two fixed intervals ABVE1 between the two partial injections. These intervals are selected so that a maximum quantity and/or a minimum quantity arise in the basic characteristics map.

The correction value, determined in this manner, which represents the offset with respect to an injection not having a preceding injection, is now derived in the connection point 210 from desired injection quantity and is supplied to maximum value selection 215. In maximum value selection 215, this value is compared with a minimum quantity, which is read out from the characteristics map of minimum value input 270. The minimum quantity is also calculated as a function of the rail pressure and of the interval between the two partial injections. For determining the characteristics map, the drive duration of the injectors is set at the minimum drive duration for the specific rail pressure.

In this embodiment, the basic value is stipulated on the basis of variables that characterize the fuel quantity metered in the preceding partial injection(s) and a corrected interval ABVE1 between the two partial injections. The weighting factor is stipulated on the basis of variables which characterize rail pressure P and the fuel quantity to be injected in the injection to be corrected.

Figure 3:
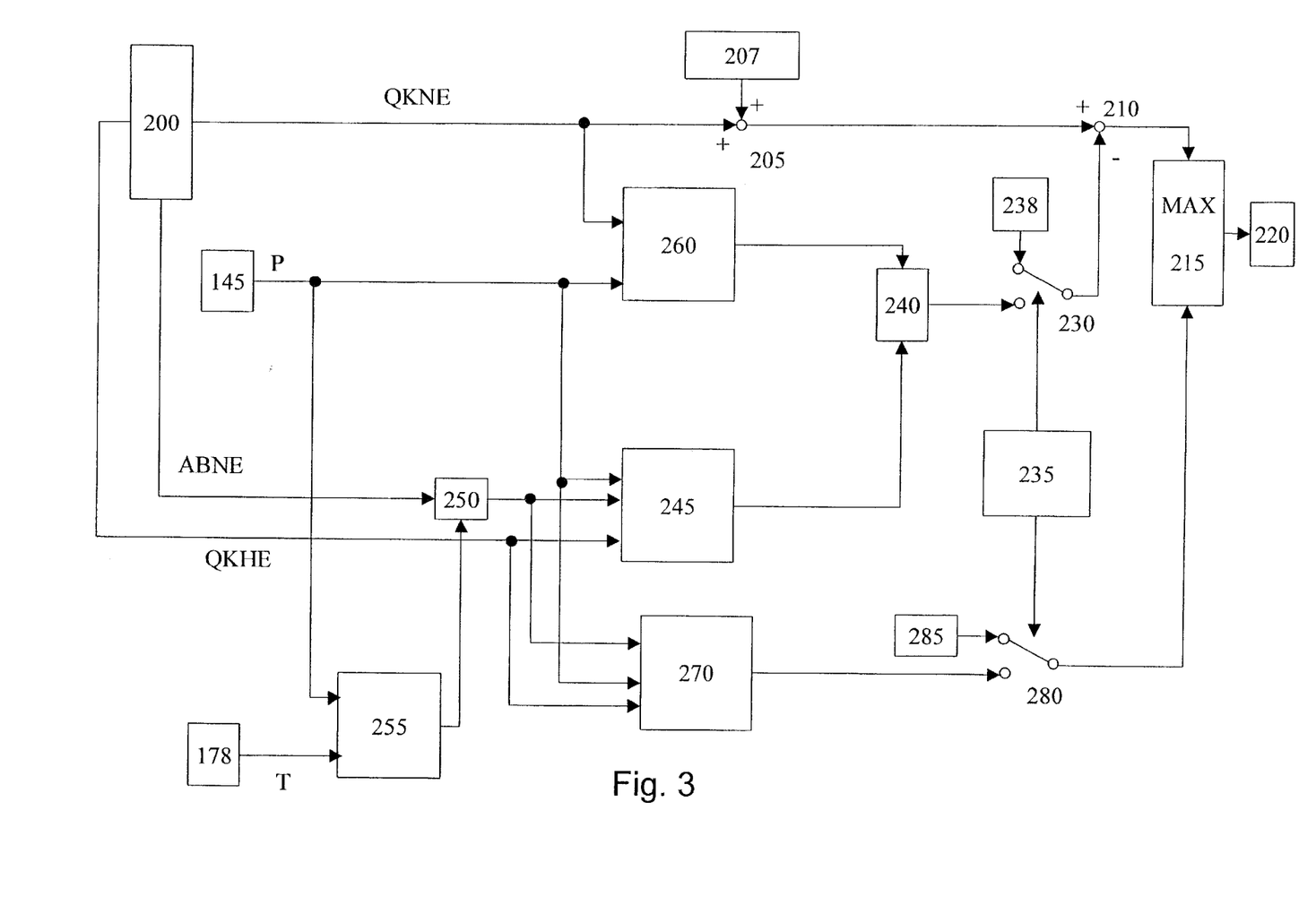

A further particularly advantageous embodiment is depicted in FIG. 3. The elements already described in FIG. 2 are provided with the same reference numerals. The essential difference in the embodiment according to FIG. 3 with respect to FIG. 2 lies in the fact that here the main injection is the preceding injection and an after-injection is the succeeding injection. This means that a variable QKNE is corrected which characterizes the fuel quantity supplied in the after-injection. This correction takes place on the basis of a variable ABNE, which stipulates the interval between the main injection and the after-injection, and a variable QKHE, which characterizes the fuel quantity metered in the main injection. In addition, in contrast to the embodiment according to FIG. 2, fuel quantity QKHE of the preceding injection is additionally taken into account by basic value input 245 and minimum value input 270. For this purpose, quantity input 200 acts upon basic value input 245 and/or minimum value input 270 using an appropriate variable QKHE, which characterizes the fuel quantity supplied in the preceding injection.

This means that the characteristics map of blocks 245 and 270 must be expanded by one dimension. This mode of proceeding is especially suited to correct the influence of the main injection on the after-injection. The influence of the injection quantity in the preceding injection must be taken into account here because the quantity in the main injection is substantially larger than the quantity in the second partial injection.

In this embodiment, the basic value is stipulated on basis of variables which characterize rail pressure P, the fuel quantity supplied in a preceding partial injection, and a corrected interval between the two partial injections. The weighting factor is stipulated on the basis of quantities which characterize rail pressure P and the fuel quantity to be injected in the injection to be corrected.

Figure 3A:
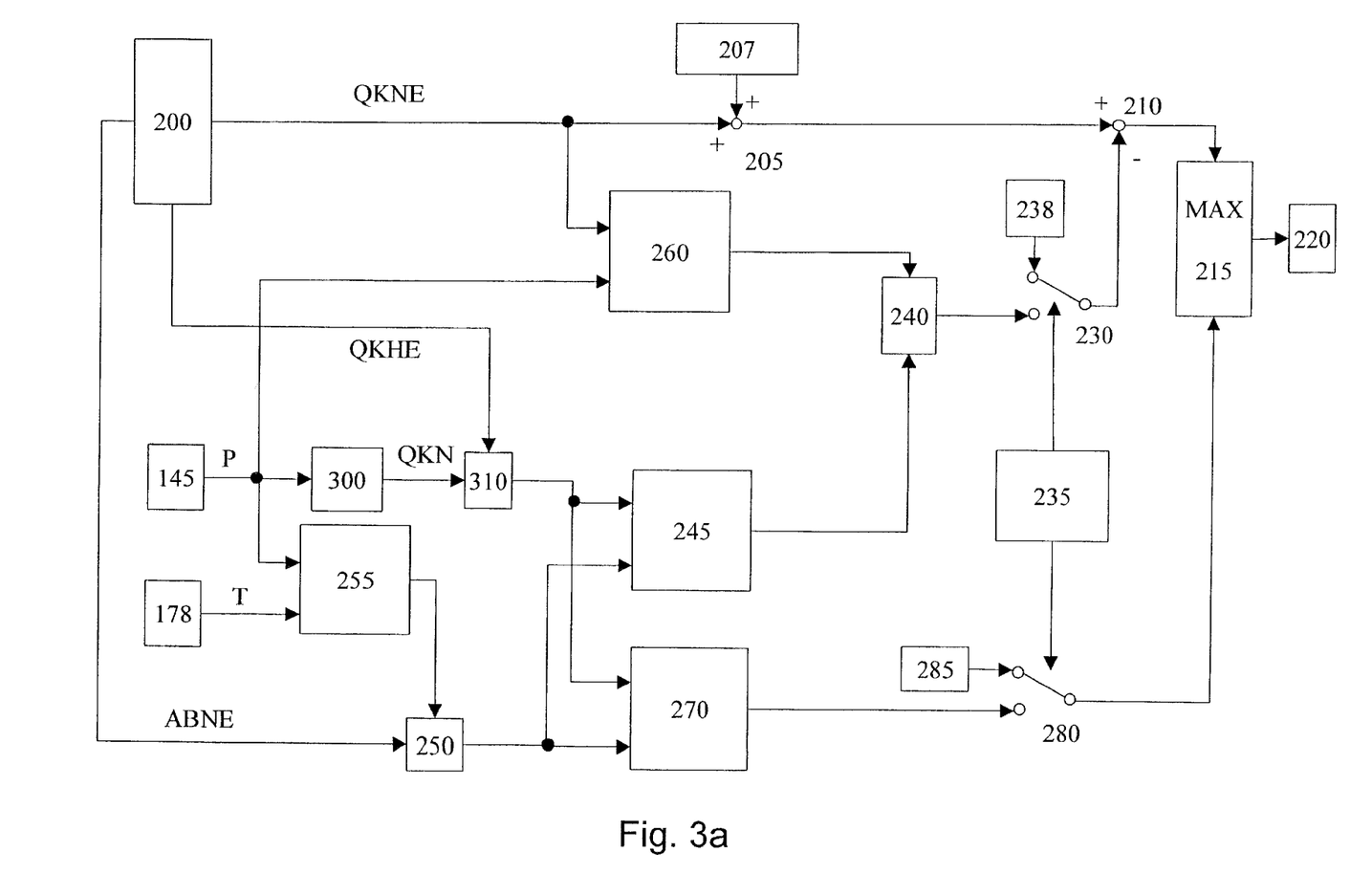

One particularly advantageous embodiment is depicted in FIG. 3a. The dependency of the correction on the rail pressure is taken into account exclusively via the dependency of weighting factor input 260 and/or temperature correction 255. These are to be configured and applied accordingly. On the basis of this mode of proceeding, the application, specifically the determination of the characteristics map values, is substantially simplified.

In this embodiment, the fuel quantity of the preceding partial injection is normalized. This normalized fuel quantity is then read into the various calculations and characteristics maps. In this context, the fuel quantity is normalized at quantity QKN, at which it is possible to make the transition from a ballistic operation of the jet needle to an operation at the stroke limit stop. This means that it is a question of the quantity at which the jet needle just reaches the completely opened state. At smaller quantities, the jet needle closes before being completely opened. This quantity value is essentially a function of rail pressure P. As a result of the normalization, it is possible to use the basic characteristics map also for the after-injection.

The characteristics map 300, to which fuel pressure P is supplied as an input signal, is made available to a connection point 310. The output signal of the connection point is then used in place of the fuel quantity of the preceding partial injection. In connection point 310, fuel quantity QKHE is normalized with quantity QKN. In characteristics map 300, quantity QKN, used for normalization purposes, is stored as a function of pressure P. In basic value input 245, the correction values are stored as a function of corrected interval ABNE and the normalized injection quantity.

In this exemplary embodiment, the basic value is provided on the basis of variables which characterize the fuel quantity metered in the preceding partial injection and a corrected interval ABNE between the two partial injections. The weighting factor is stipulated on basis of variables which characterize rail pressure P and the fuel quantity to be injected in the injection to be corrected.

Figure 4:
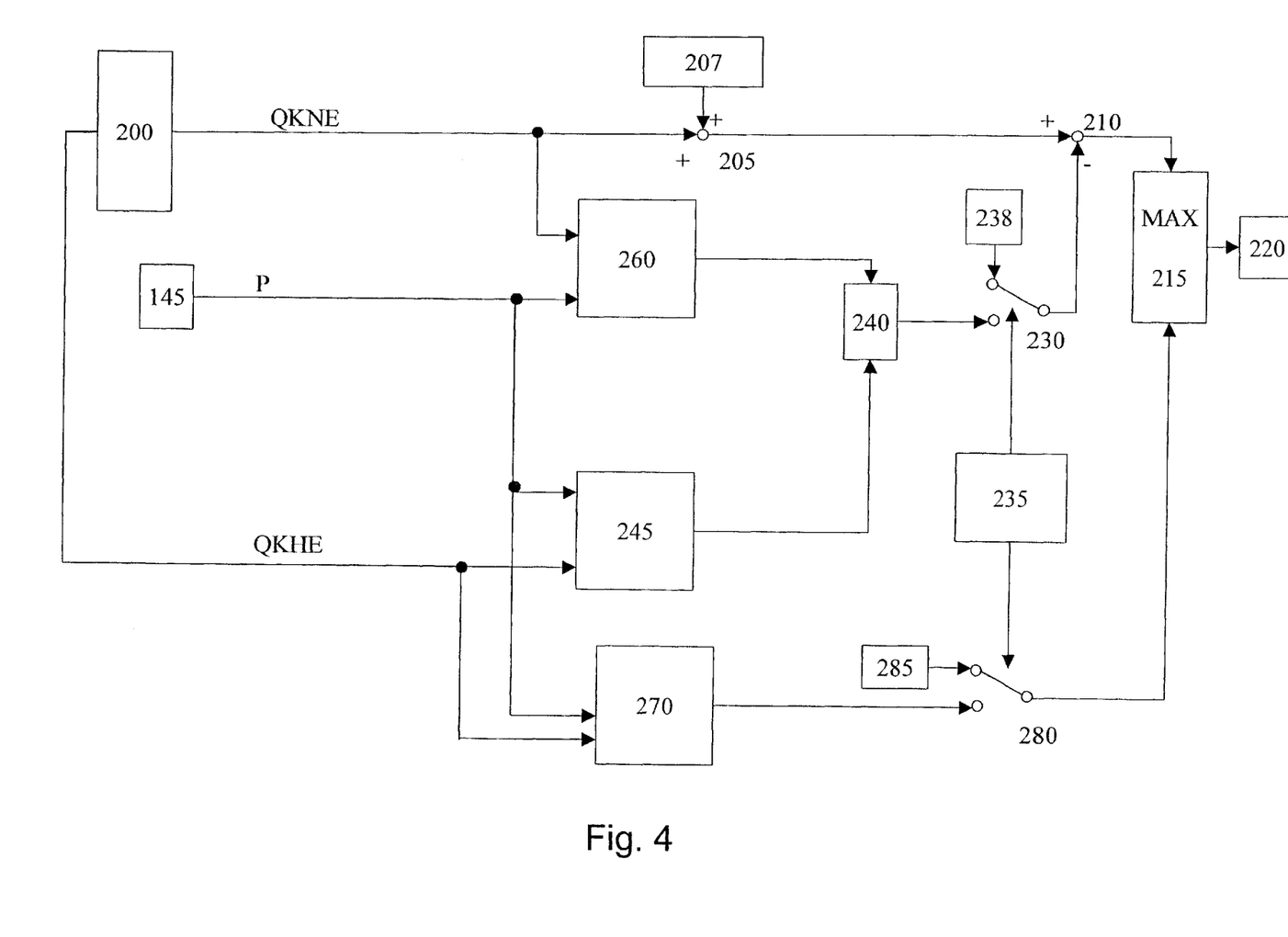

A further advantageous embodiment is depicted in FIG. 4, in which the interval between the two partial injections is not taken into account. This embodiment is essentially different from the embodiment in FIG. 3 in the fact that blocks 178, 255, 250, which take into account the interval between the two partial injections and their temperature dependency, are omitted.

In this embodiment, the basic value is stipulated on the basis of the variables which characterize rail pressure P and the fuel quantity metered in the preceding partial injection. The weighting factor is stipulated on basis of variables which characterize rail pressure P and the fuel quantity to be injected in the injection to be corrected.

What is claimed is:

1. A method for controlling fuel-metering of an internal combustion engine, comprising:
   providing a first partial injection of fuel during a single fuel-injection cycle; and
   providing a second partial injection of fuel during the single fuel-injection cycle;
   wherein, in the second partial injection, a fuel-quantity variable, which characterizes the fuel quantity injected during the second partial injection, is corrected as a function of at least one pressure variable, which characterizes the fuel pressure, of the fuel quantity variable, and of at least one further correction variable.

2. The method as recited in claim 1, wherein a correction value is determined for the fuel quantity to be injected on the basis of a basic value that is determined by using a weighting factor.

3. The method as recited in claim 2, wherein the basic value is determined as one of: a function of at least the pressure variable and an interval between the two partial injections; and a function of at least the pressure variable and the fuel quantity injected in the first partial injection.

4. The method as recited in claim 2, wherein the weighting factor is determined as a function of at least the fuel quantity variable.

5. The method as recited in claim 1, wherein the at least one further correction variable is a temperature variable.

6. The method as recited in claim 1, wherein the corrected fuel quantity variable is limited to a minimum value.

7. The method as recited in claim 6, wherein the minimum value is determined as a function of at least one of the rail pressure and the interval between the two partial injections.

8. The method as recited in claim 1, wherein the correction is carried out after a further correction, using a quantity balancing regulation.

9. The method as recited in claim 1, wherein the correction is only performed in selected operating states of the internal combustion engin.

10. A device for controlling an internal combustion engine, comprising:

a fuel metering system for providing at least a first partial injection and a second partial injection of fuel during a single fuel-injection cycle; and means for providing, in the second partial injection, correction of a fuel quantity variable, which characterizes the fuel quantity injected in the second partial injection, as a function of at least one pressure variable, which characterizes the fuel pressure, of the fuel quantity variable and of at least one further correction variable.

* * * * *